April 22, 1930.  W. R. G. BAKER  1,755,859
SYSTEM OF ELECTRICAL DISTRIBUTION
Filed Nov. 6, 1923
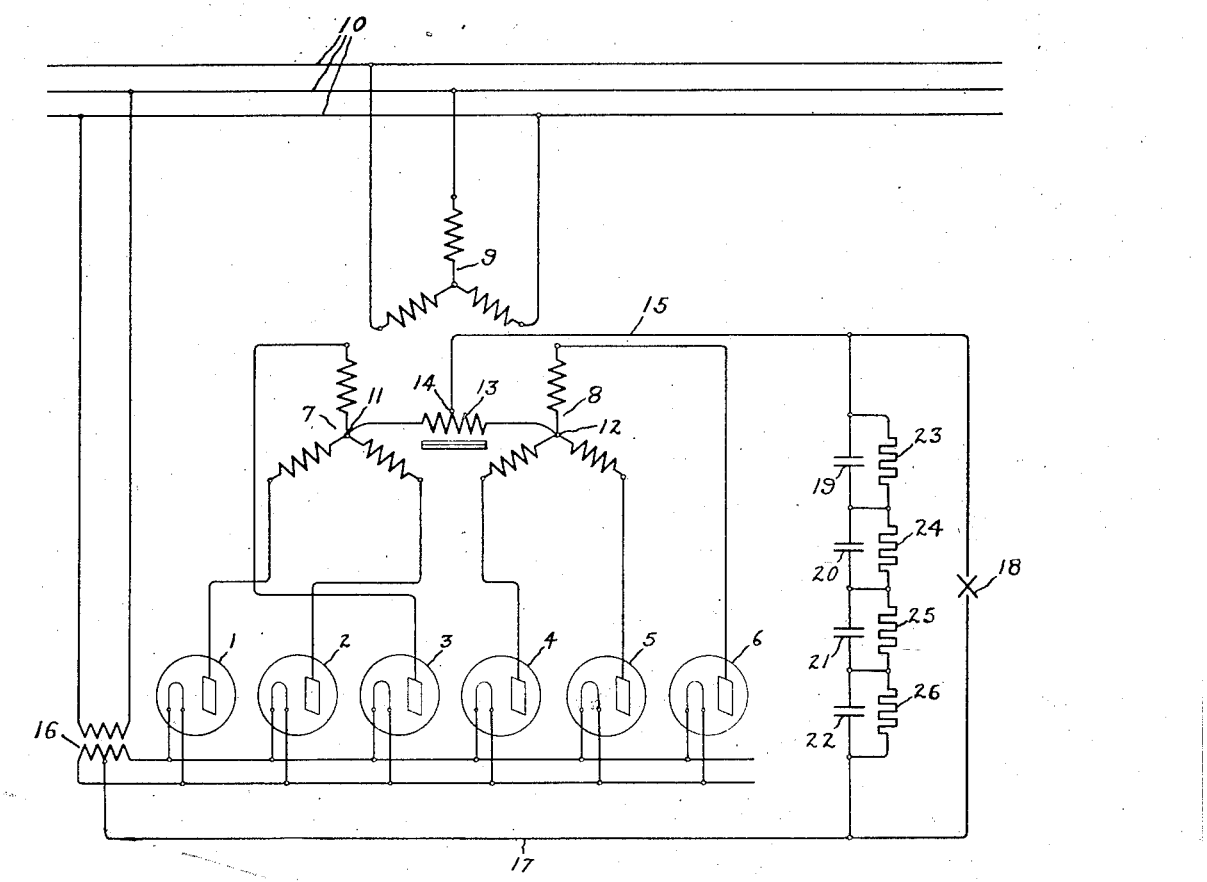
Inventor:
Walter R.G.Baker
by
His Attorney Patented Apr. 22, 1930

1,755,859

UNITED STATES PATENT OFFICE

WALTER R. G. BAKER, OF SCHENECTADY, NEW YORK, ASSIGNOR TO GENERAL ELECTRIC COMPANY, A CORPORATION OF NEW YORK

SYSTEM OF ELECTRICAL DISTRIBUTION

Application filed November 6, 1923. Serial No. 673,192.

My present invention relates to systems of electrical distribution and more particularly to systems in which consumption apparatus is supplied with high voltage direct current by the rectification of alternating current.

When rectifiers are employed which have a high internal resistance, such for example as high vacuum thermionic rectifiers, there will be a considerable variation in the direct current voltage between no load and full load. When the load to be supplied is fairly constant this characteristic does not present any serious difficulty. When, however, the load to be supplied fluctuates rapidly between no load and full load, as in the case of a wireless telegraph transmitter, for example, the rapid changes from no load voltage to full load voltage and vice versa, may set up in the load apparatus transient voltages of much greater value than the voltage at which the apparatus is intended to operate. The presence of such transient voltages renders much more difficult the problem of satisfactory design for the consumption apparatus.

I have discovered that this difficulty may be overcome by connecting permanently across the direct current supply circuit a resistance load of comparatively small value, say from 5% to 10% of the value of the load to be supplied by the rectifier. In case series connected condensers are connected across the direct current circuit for smoothing out purposes the load resistance may also serve as protective resistance for the condensers by subdividing the resistance and connecting a section in shunt to each condenser.

My invention will best be understood by reference to the following description taken in connection with the accompanying drawing in which I have indicated diagrammatically one way whereby my invention may be carried into effect.

I have indicated in the drawing a rectifier system comprising thermionic rectifiers 1 to 6 inclusive, the anodes of which are connected to the terminals of two Y-connected transformer secondaries 7 and 8. The primary winding 9 of these secondaries is supplied with current from the three-phase supply mains 10. The neutral points 11 and 12 of the two secondaries are connected together through an interphase transformer 13 the middle point 14 of which is connected to one side of the consumption circuit by a lead 15. The cathodes of the rectifiers 1 to 6 are all connected in parallel and supplied with heating current by a transformer 16, the primary of which is supplied from one phase of the alternating current supply mains 10. The middle point of the secondary of transformer 16 is connected by a lead 17 to the other side of the consumption circuit which supplies current to a load 18.

Series connected condensers 19 to 22 are connected across the leads 15 and 17 for smoothing out the rectified current. Resistors 23, 24, 25 and 26 are connected in shunt to these condensers. These resistors form a permanent load on the rectifier and at the same time serve to protect the condensers by causing the total voltage to be uniformly distributed among the several condensers.

While I have shown and described only one embodiment of my invention it will be apparent that many modifications in the manner in which it is applied may be made without departing from the scope thereof as set forth in the appended claims.

What I claim as new and desire to secure by Letters Patent of the United States, is:—

1. The combination in a system of electrical distribution, of a source of high potential alternating current, means for rectifying the current from the source, said means including a plurality of secondary transformer windings, an interphase winding connecting said secondary windings, and a rectifier having high internal resistance connected to said secondary windings, a consumption circuit, which is subject to frequent and large variations in the amount of current used, connected to said rectifier, and a resistance load permanently connected across said consumption circuit, said resistance load being small in comparison with the total load to be supplied.

2. The combination in a system of electrical distribution of a source of high potential alternating current, a consumption circuit which is subject to a large variation in the amount of current used, a thermionic rectifier for rectifying the current from said source and delivering rectified current to said consumption circuit, a plurality of condensers connected in series across said consumption circuit and an individual resistance in shunt to each condenser, the sum of said individual resistances being large as compared with the resistance of the consumption circuit.

3. The combination in a system of electrical distribution of a source of high potential alternating current, a consumption circuit which is subject to frequent and large variations in the amount of current used, a plurality of rectifiers having large internal resistance for rectifying the current from said source and delivering rectified current to said consumption circuit, and a resistance load permanently connected across said consumption circuit, said resistance load being small in comparison with the total load to be supplied.

4. In a system of distribution, a source of alternating current including a plurality of secondary transformer windings, an interphase winding connecting said secondary windings, means for rectifying the current from said source, said means including a thermionic valve, a direct current consumption circuit, which is subject to frequent and large variations in the amount of current used, connected to said interphase winding and rectifier, and a resistance load permanently connected across said consumption circuit, said resistance load being small in comparison with the total load to be supplied.

5. In combination, a source of alternating current, a load circuit which is subject to frequent and large variations in the amount of current used, means for delivering current from said source to said load circuit, said means comprising a transformer having a plurality of secondary windings and an interphase winding connecting said secondary windings, and a rectifier having high internal resistance connected to the secondary transformer windings and load circuit, and means comprising a resistor connected across the load circuit for maintaining the voltage supplied to the load circuit substantially constant as the current supplied to said load circuit approaches zero, said resistance having a value which is high as compared to the resistance of the load circuit.

In witness whereof, I have hereunto set my hand this 5th day of November, 1923.

WALTER R. G. BAKER.